United States Patent
Sakato et al.

[11] Patent Number: 5,890,667
[45] Date of Patent: *Apr. 6, 1999

[54] CRUSHING MACHINE

[75] Inventors: Seiichi Sakato; Masayuki Sakato; Suehachi Miura; Takamitsu Ito; Yukio Nakata; Masayuki Asai, all of Chiba, Japan

[73] Assignee: Kabushiki Kaisha Sakato Kosakusho, Chiba-ken, Japan

[*] Notice: The portion of the term of this patent subsequent to Nov. 1, 2016, has been disclaimed.

[21] Appl. No.: 770,275

[22] Filed: Dec. 20, 1996

[30] Foreign Application Priority Data

Dec. 22, 1995 [JP] Japan .................................. 7-335277
Nov. 29, 1996 [JP] Japan .................................. 8-320394

[51] Int. Cl.$^6$ .................................................. B02C 1/10
[52] U.S. Cl. ............................................................ 241/264
[58] Field of Search ................................ 241/266, 264, 241/300.1, 291, 101.73; 30/134, 167.1, 168

[56] References Cited

U.S. PATENT DOCUMENTS

| | | | |
|---|---|---|---|
| 4,776,524 | 10/1988 | Sakato | 241/101.73 |
| 5,628,611 | 5/1997 | Ito et al. | 241/101.73 |
| 5,645,236 | 7/1997 | Sugiura et al. | 241/101.73 |

FOREIGN PATENT DOCUMENTS 60-43513  9/1985  Japan .

Primary Examiner—Mark Rosenbaum
Attorney, Agent, or Firm—Lowe Hauptman Gopstein Gilman & Berner

[57] ABSTRACT

A crushing machine having enhanced crushing efficiency. The crushing machine includes an outer casing having a fixed jaw and a movable jaw each having a crushing blade for crushing reinforced concrete. The movable jaw includes a crushing blade having a rear-side edge formed in a substantially right-angled shape with a small arcuate edge portion located at an angled edge portion thereof, and a front-side edge generally formed by a large arcuate edge portion. The rear-side edge of the movable jaw crushing blade is oriented to face in a longitudinally inward direction away from a distal end of the movable jaw. The inward orientation of the rear-side edge along with its substantially right-angled shape allow the movable jaw crushing blade to concentrate the load of the crushing machine to the small point of contact between the movable jaw crushing blade and the reinforced concrete, thereby maximizing the crushing efficiency of the crushing machine. The shape and orientation of the movable jaw crushing blade of the present invention also allows the blade to bite into the concrete, thereby preventing slippage between the blade and the concrete.

6 Claims, 17 Drawing Sheets

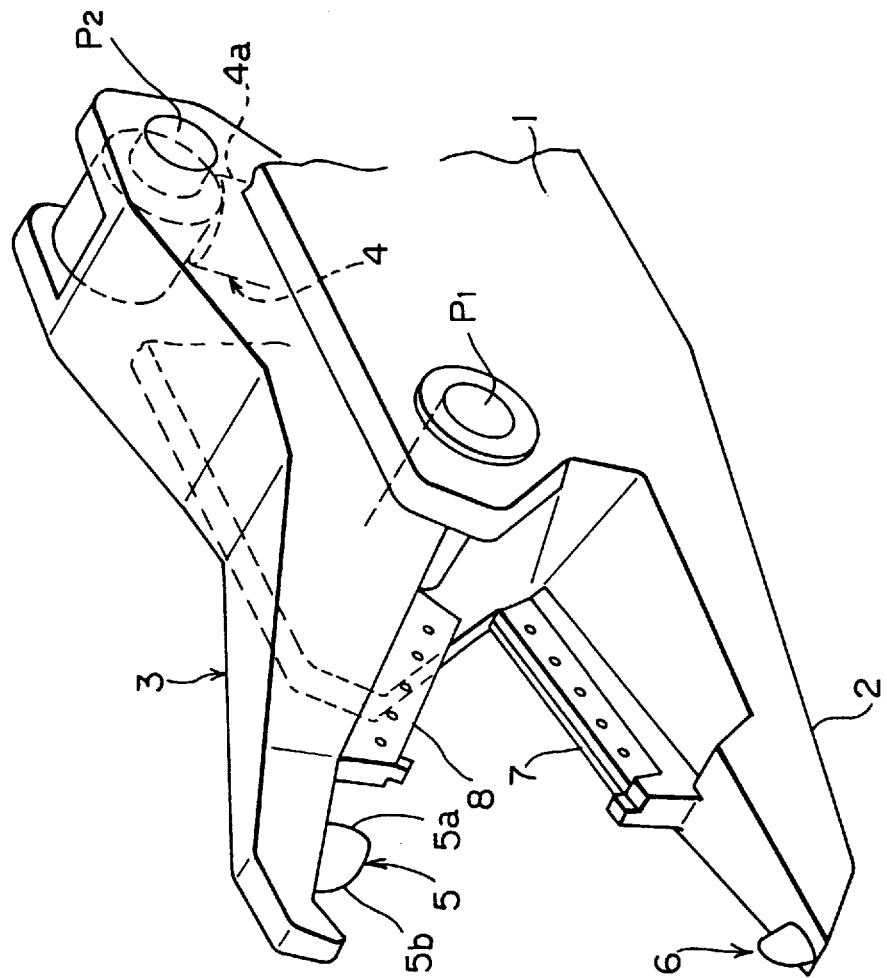

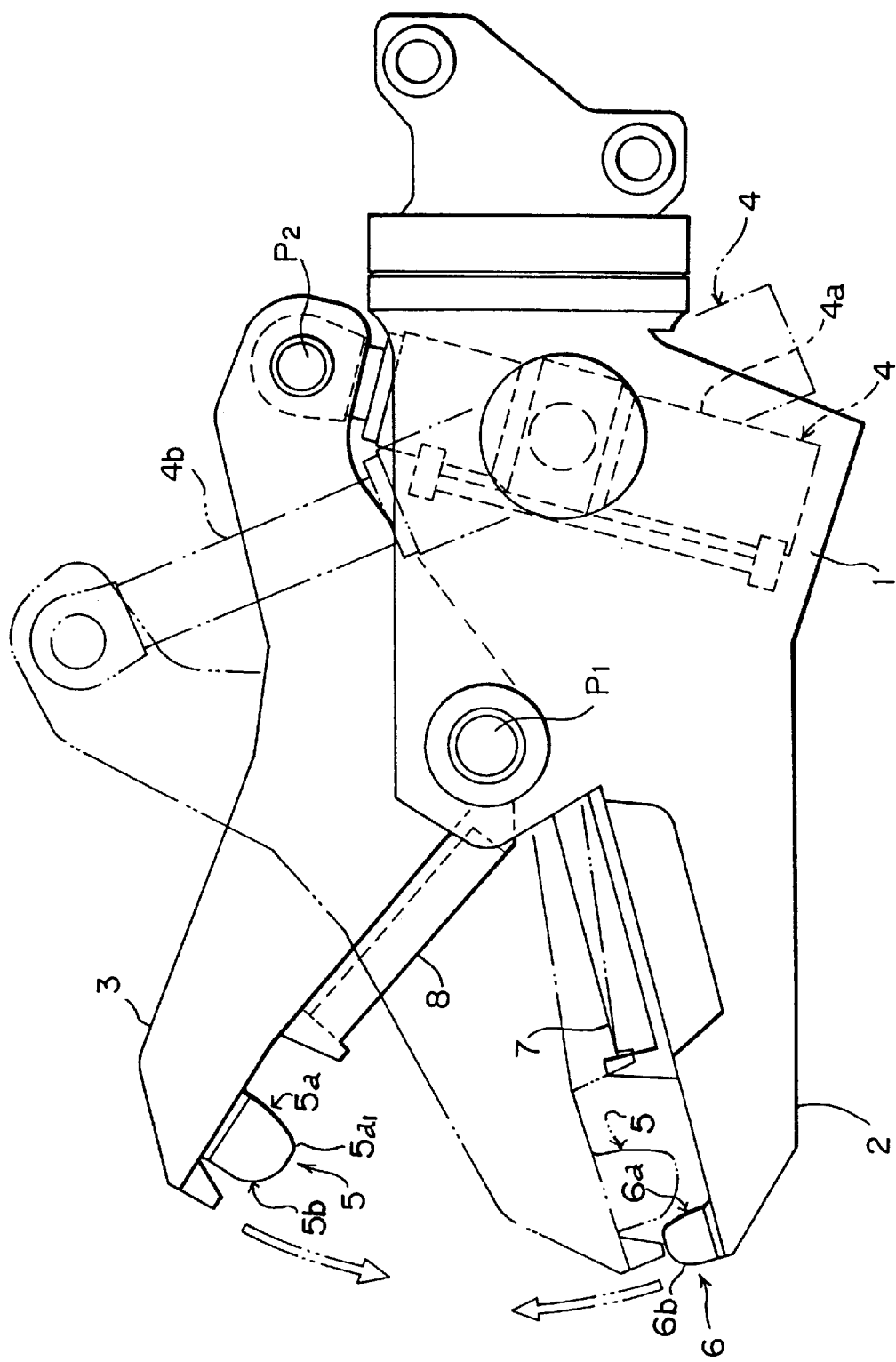

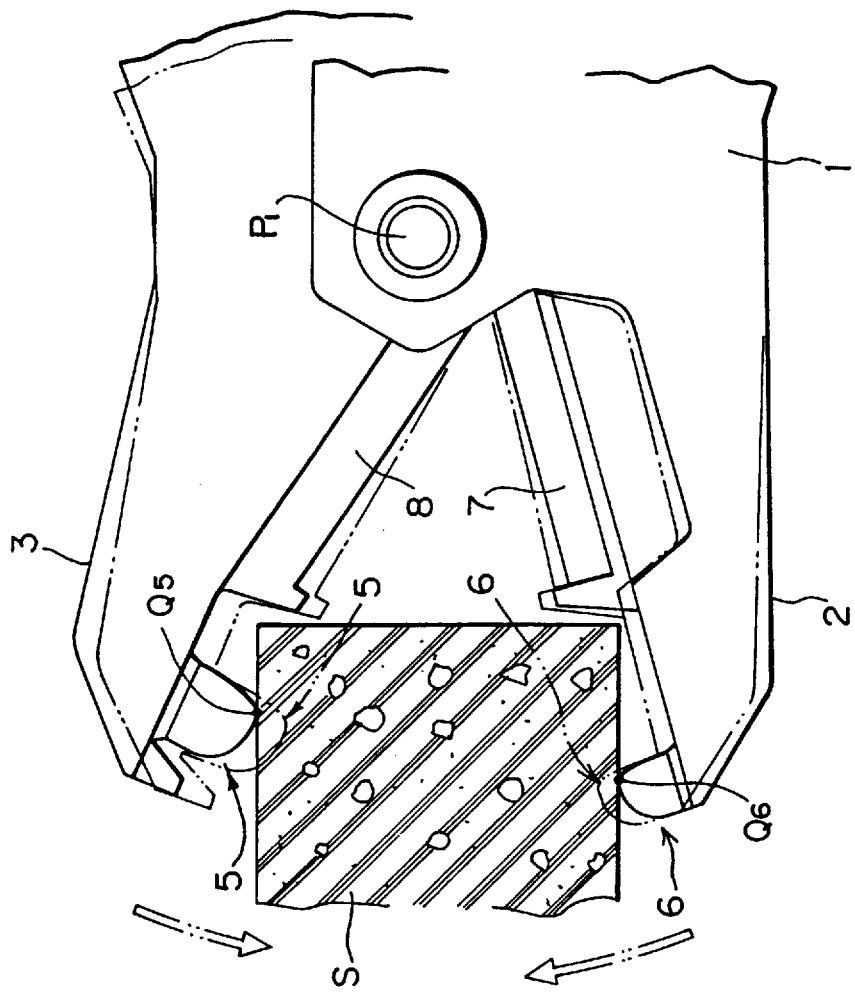

CRUSHING MACHINE

BACKGROUND OF THE INVENTION

1. Field of the Invention:

The present invention relates to a crushing machine which is used as a principal section of an apparatus for demolishing structures (buildings and the like) made as reinforced concrete, and which is capable of efficiently crushing concrete structural members such as reinforced concrete walls, floors, ceilings, and pillars.

2. Description of the Related Art:

In recent years, there are various types of crushing machines for crushing concrete structural members such as walls and pillars of structures (buildings and the like) made of such as reinforced concrete. Many of these crushing machines are arranged such that a fixed jaw and a movable jaw are provided in such a manner as to be freely opened or closed by a hydraulic cylinder mechanism or the like, and the concrete structural members are crushed by crushing blades which are respectively provided on the fixed jaw and the movable jaw.

Crushing blades formed substantially in the shape of a half-split bead of a soroban, or an abacus, i.e., crushing blade having a semicircular profile, are used widely, as disclosed in Japanese Patent Application Publication No. 43513/1985. The mechanism of this a semicircular crushing blade operates such that, during the crushing of a concrete structural member, the crushing blade first bites into the concrete structural member, which is clamped by the fixed jaw and the movable jaw, in the manner of a wedge, the concrete structural member then becomes cracked as the depth of the bite becomes deeper, and the concrete structural member is crushed as the cracks become wider.

In particular, among semicircular crushing blades formed substantially in the shape of a half-split bead of a soroban, there is a type in which the side elevational shape is not completely semicircular but trapezoidal, and the front edge side is substantially right-angled, while the rear edge side is formed in the shape of a circular arc. This type of movable-side crushing blade is provided such that an arcuate blade portion on the rear edge side thereof opposes the fixed jaw located therebelow.

With such a movable-side crushing blade, the movable-side crushing blade formed bites into and cracks the concrete structural member as described above, thereby making it possible to crush the concrete structural member such as a wall, a pillar, and the like. In particular, as shown in FIG. 17, where the side elevational shape of the crushing blade is trapezoidal with its front edge side formed in a substantially right-angled shape and with its overall rear edge side formed substantially in the shape of a circular arc, when the movable jaw is closed to clamp the concrete structural member in cooperation with the fixed jaw, the rear edge side of the crushing blade is first brought into contact with the concrete structural member to crush the concrete structural member.

Then, the arcuate blade portion pierces the surface of the concrete structural member over a relatively large range, and makes it possible to crush the concrete structural member while cracking that portion of the concrete structural member almost instantly. The crushing blade of this type is very effective in a case where the internal structure of the concrete structural member itself has become relatively fragile.

However, among the concrete structural members, particularly in the case of a concrete structural member in which the density of a concrete component is high, the concrete structural member is very hard, and resistance during crushing may be very large. When such a particularly hard concrete structural member is crushed, in the case of the crushing blade with its overall rear edge side formed in the shape of a circular arc, a portion of contact of the movable-side crushing blade with respect to the concrete structural member during an initial period of crushing extends over a long range, and assumes a state of line contact.

Hence, the force for crushing is dispersed at the contact surface which is in the state of line contact, and the crushing force becomes relatively small per unit area, thereby making it very difficult to effect crushing. Further, with the conventional types of crushing machines, slippage can occur between the crushing blades and the concrete structural member when the concrete structural member is crushed, so that the concrete structural member is frequently dislocated from the fixed jaw and the movable jaw, resulting in a decline in the efficiency of the crushing operation.

Particularly in the case of a large pillar-shaped member whose cross section is substantially square or rectangular, the pillar-shaped member must be crushed at its right-angled corner portions, which means that portions of two wall surfaces which join at right angles are crushed by the two crushing blades. In this case, the two wall surfaces which join at right angles constitute relatively sharply inclined surfaces with respect to the two crushing blades that are provided on the fixed jaw and the movable jaw. Accordingly, when an attempt is made to effect a crushing operation at the two wall surfaces which join at right angles by means of the two crushing blades, the crushing blades tend to slip on the wall surfaces before they bite into the wall surfaces.

Thus, the crushing operation at a right-angled corner portion of such a rectangular pillar-shaped member has been very difficult.

SUMMARY OF THE INVENTION

Accordingly, it is an object of the present invention to provide a crushing machine with enhanced crushing efficiency by using a concentrated load system based on a state of point contact, even with respect to a particularly hard and large rectangular concrete structural member, thereby overcoming the above-described drawbacks of the conventional art.

To this end, in accordance with a first aspect of the present invention, there is provided an comprising: an outer casing; a fixed jaw body provided fixedly on the outer casing; a movable jaw body provided movably on the outer casing to effect an opening and closing operation in cooperation with the fixed jaw body; a movable-side crushing blade and including a rear-side edge formed in a substantially right-angled shape with a small arcuate edge portion located at an angled portion thereof and a front-side edge generally formed by a large arcuate edge portion, the front-side edge being oriented to face a longitudinally outward direction towards a distal end of the movable jaw body; and a fixed-side crushing blade and provided at a distal end of the fixed jaw body.

In accordance with the above-described first aspect of the present invention, various advantages are offered in that the crushing machine is suitable for crushing an object to be crushed such as a particularly hard concrete structure member, that the object to be crushed such as the concrete structural member, which is clamped by the fixed jaw body and the movable jaw body during the crushing operation, can be reliably crushed without causing slippage, and that the structure is very simple.

In accordance with a second aspect of the present invention, in the crushing machine according to the first aspect of the invention, the fixed-side crushing blade has a shape substantially similar to that of the movable-side crushing blade, and has a rear-side edge which is located in such a manner as to face a longitudinally inward direction side of the fixed jaw body. By virtue of the provision of this arrangement, when the movable-side crushing blade moves in the direction of closing with respect to the fixed-side crushing blade, the operation is effected in such a manner as to send the object to be crushed in the longitudinally inward directions of the fixed jaw body and the movable jaw body, i.e., in a direction toward a movable-jaw pivotally supporting portion, thereby making it possible to reliably crush the object to be crushed.

In accordance with a third aspect of the present invention, the fixed-side crushing blade has a shape substantially similar to that of the movable-side crushing blade, and has a rear-side edge which is located in such a manner as to face a longitudinally inward direction side of the fixed jaw body, the fixed-side crushing blade in a side view being smaller than the movable-side crushing blade. By virtue of the provision of this arrangement, in the crushing of the object to be crushed, the fixed-side crushing blade is first capable of biting into the object to be crushed relatively speedily so as to reliably fix the object to be crushed on the fixed jaw body side. At the same time, the large movable-side crushing blade powerfully crushes the object to be crushed, thereby making it possible to reliably effect the crushing operation without loss in operation.

In accordance with a fourth aspect of the present invention, in the crushing machine according to the first, second, or third aspect of the invention, the movable-side crushing blade and the fixed-side crushing blade are disposed such that positions thereof are appropriately offset from each other in the longitudinal direction. By virtue of the provision of this arrangement, as for the movable-side crushing blade and the fixed-side crushing blade, when the fixed jaw body and the movable jaw body are fully opened relative to each other, an interval $H_1$ between the movable-side crushing blade and the fixed-side crushing blade can be made larger than an interval $H_2$ between the movable-side crushing blade and the fixed-side crushing blade in a case where their positions are not offset from each other (see FIGS. 16A and 16B).

In accordance with a fifth aspect of the present invention, in the crushing machine according to the fourth aspect of the invention, the fixed-side crushing blade is positioned longitudinally outwardly of the movable-side crushing blade. By virtue of the provision of this arrangement, it is possible to allow a large crushing force to be produced instantaneously by the fixed-side crushing blade.

The above and other objects, features and advantages of the present invention will become more apparent from the following detailed description of the invention when read in conjunction with the accompanying drawings.

BRIEF DESCRIPTION OF THE DRAWINGS

FIG. 1 is a perspective view of essential portions of a crushing machine in accordance with the present invention;

FIG. 2 is a side elevational view of the crushing machine in accordance with the present invention;

FIG. 4 is a side elevational view illustrating a state in which an object to be crushed is clamped by the fixed jaw body and the movable jaw body;

FIG. 7B is a side elevational view of an embodiment in which sizes of the movable-side crushing blade and the fixed-side crushing blade are set to be similar;

DESCRIPTION OF THE PREFERRED EMBODIMENTS

Figure 3A:
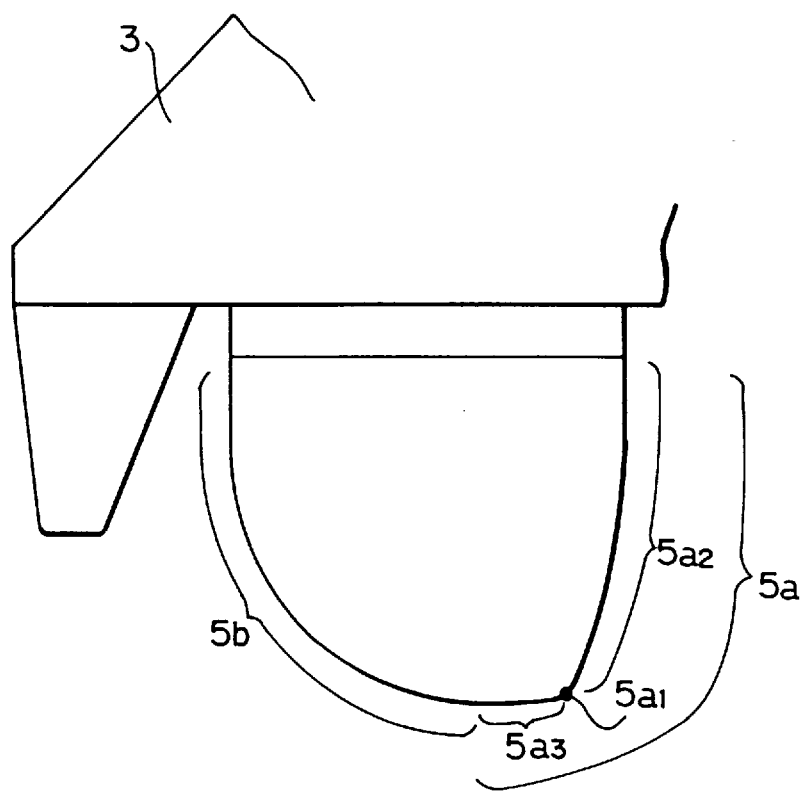
FIG. 3A is a side elevational view illustrating a state in which a movable-side crushing blade is mounted on a movable jaw body.

Referring now to the accompanying drawings, a description will be given of the preferred embodiments of the present invention.

As shown in FIGS. 1 and 2, the crushing machine is mainly comprised of a crushing machine outer casing 1, a fixed jaw body 2, and a movable jaw body 3. The fixed jaw body 2 is provided fixedly on the crushing machine outer casing 1, and the movable jaw body 3 which is provided movably on the crushing machine outer casing 1 effects an opening and closing operation in cooperation with the fixed jaw body 2. The movable jaw body 3 is pivotally supported at its substantially intermediate portion by the crushing machine outer casing 1, and this pivotally supporting portion will be referred to as a movable-jaw pivotally supporting portion $P_1$.

Here, the sides of the fixed jaw body 2 and the movable jaw body 3 which face each other in the opening and closing direction will be referred to as working surface sides of the fixed jaw body 2 and the movable jaw body 3, while the sides thereof which are opposite to the working surface sides will be referred to as outer sides of the fixed jaw body 2 and the movable jaw body 3. Further, the longitudinal directions of the fixed jaw body 2 and the movable jaw body 3 which are referred to herein are those in which the fixed jaw body 2 and the movable jaw body 3 project outwardly of the crushing machine outer casing 1, and the widthwise direction is a direction which is perpendicular to the longitudinal direction.

As shown in FIGS. 1 and 2, the fixed jaw body 2 and the movable jaw body 3 are movably operated by a cylinder 4 which is mounted inside the crushing machine outer casing 1. As shown in FIG. 2, the cylinder 4 is arranged such that a cylinder tube 4a is provided in such a manner as to be rotatable in a vertical plane within the crushing machine outer casing 1, and a distal end of a piston rod 4b is pivotally supported at an end of the movable jaw body 3 which is opposite to the blade thereof. This pivotally supporting portion will be referred to as a piston-rod pivotally supporting portion $P_2$.

As shown in FIGS. 1 and 2, a fixed jaw-side cutter 7 is provided on the working surface side of the fixed jaw body 2 in such a manner as to extend in the longitudinal direction, while a movable jaw-side cutter 8 is provided on the working surface side of the movable jaw body 3 in such a manner as to extend in the longitudinal direction. When the movable jaw body 3 is closed with respect to the fixed jaw body 2, the fixed jaw-side cutter 7 and the movable jaw-side cutter 8 relatively move in the manner of a pair of scissors in conjunction with the movement of the movable jaw body 3, thereby cutting the member to be cut by shearing.

Figure 7A:
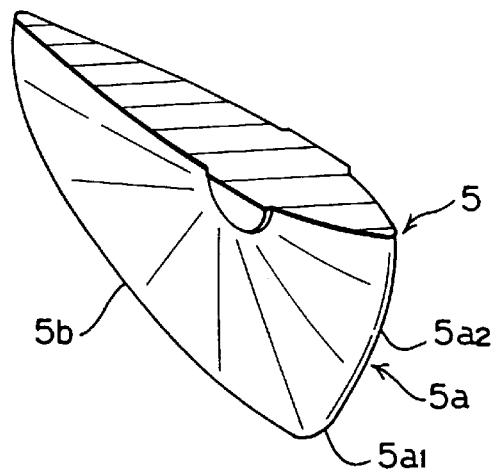
FIG. 7A is a perspective view of the movable-side crushing blade which is sectioned.

A movable-side crushing blade 5 is attached to the movable jaw body 3. The movable-side crushing blade 5 is formed substantially in the shape of a half-split bead of a soroban, and is gradually tapered toward its edge. The movable-side crushing blade 5 has a streamlined shape in which its transverse dimension is largest at a position slightly offset toward the rear side from a longitudinal center thereof (see FIG. 7A).

A portion of the movable-side crushing blade 5 which is located on the rear side as viewed in a side view will be referred to as a rear-side edge 5a, while a portion of the movable-side crushing blade 5 which is located on the front side will be referred to as a front-side edge 5b. The rear-side edge 5a, as viewed in a side view, is formed in a substantially right-angled shape with a small arcuate edge portion $5a_1$ located at an angled portion thereof. The small arcuate edge portion $5a_1$ constitutes an angled portion of the substantially right-angled rear-side edge 5a, and a tip of its angled portion is formed in the shape of a small circular arc.

The radius of curvature of the small circular arc is very small in terms of the overall movable-side crushing blade 5. In addition, the right-angled rear-side edge 5a, when seen in a side view, is seen in a state of a substantially right angle. The state of a substantially right angle includes the state of an angle close to the right angle such as an obtuse angle or an acute angle (see FIG. 3A and the like). The right-angled rear-side edge 5a is constituted by the small arcuate edge portion $5a_1$ as well as a rear-end edge portion $5a_2$ and a front-end edge portion $5a_3$. The rear-end edge portion $5a_2$ and the front-end edge portion $5a_3$ are formed continuously via the small arcuate edge portion $5a_1$, while the front side of the front-end edge portion $5a_3$ is formed continuously with the front-side edge 5b (see FIG. 3A).

The movable-side crushing blade 5 is mounted on the movable jaw body 3 in the vicinity of its distal end such that the rear-side edge 5a of the movable-side crushing blade 5 is located in such a manner as to face a longitudinally inward direction side of the movable jaw body 3. In this specification and in the appended claims, the longitudinally inward direction side of the movable jaw body 3 refers to a side thereof which is closer to the aforementioned movable-jaw pivotally supporting portion $P_1$. That is, the rear-side edge 5a faces the movable-jaw pivotally supporting portion $P_1$ (refer to FIG. 2). The shape of the front-side edge 5b of the movable-side crushing blade 5 as a whole is generally formed by a large arcuate edge portion, and is specifically formed substantially in the shape of one fourth of a circle. The front-side edge 5b is formed continuously from the rear-side edge 5a.

Next, a fixed-side crushing blade 6 is provided on the fixed jaw body 2 (see FIGS. 1 and 2). The fixed-side crushing blade 6 is mounted such that its position is offset in the longitudinal direction with respect to the movable-side crushing blade 5 in a state in which the fixed jaw body 2 and the movable jaw body 3 are closed. In the embodiment shown in FIG. 1 and the like, the fixed-side crushing blade 6 is located on the longitudinally outer side than the movable-side crushing blade 5. The fixed-side crushing blade 6 has a shape substantially similar to that of the above-described movable-side crushing blade 5. That is, the fixed-side crushing blade 6 is formed substantially in the shape of a half-split bead of a soroban, and the names of the respective portions of the fixed-side crushing blade 6 will be given correspondingly in the same way as the movable-side crushing blade 5.

Namely, in the same way as the movable-side crushing blade 5, the fixed-side crushing blade 6 has a streamlined shape in which its transverse dimension is largest at a position slightly offset toward the rear side from a longitudinal center thereof. A portion of the fixed-side crushing blade 6 which is located on the rear side as viewed in a side view will be referred to as a rear-side edge 6a, while a portion of the fixed-side crushing blade 6 which is located on the front side will be referred to as a front-side edge 6b. The rear-side edge 6a, as viewed in a side view, is formed in a substantially right-angled shape with a small arcuate edge portion $6a_1$ located at an angled portion thereof.

The small arcuate edge portion $6a_1$ constitutes an angled portion of the substantially right-angled rear-side edge 6a, and its radius of curvature is very small in terms of the overall fixed-side crushing blade 6. The right-angled rear-side edge 6a, when seen in a side view, is seen in a state of a substantially right angle. The state of a substantially right angle includes, in addition to a right angle, the state of an angle close to the right angle such as an obtuse angle or an acute angle. The right-angled rear-side edge 6a is constituted by the small arcuate edge portion $6a_1$ as well as a rear-end edge portion $6a_2$ and a front-end edge portion $6a_3$. The rear-end edge portion $6a_2$ and the front-end edge portion $6a_3$ are formed continuously via the small arcuate edge portion $6a_1$, while the front side of the front-end edge portion $6a_3$ is formed continuously with the front-side edge 6b (see FIG. 3B). Thus, the fixed-side crushing blade 6 has a shape similar to that of the movable-side crushing blade 5.

The fixed-side crushing blade 6 is mounted on the fixed jaw body 2 in the vicinity of its distal end such that the rear-side edge 6a of the fixed-side crushing blade 6 is located in such a manner as to face a longitudinally inward direction side of the fixed jaw body 2. In this specification and in the appended claims, the longitudinally inward direction side of the fixed jaw body 2 refers to a side thereof which is closer to the aforementioned movable-jaw pivotally supporting portion $P_1$. That is, the rear-side edge 6a faces the movable-jaw pivotally supporting portion $P_1$ (refer to FIGS. 1 and 2).

Figure 3B:
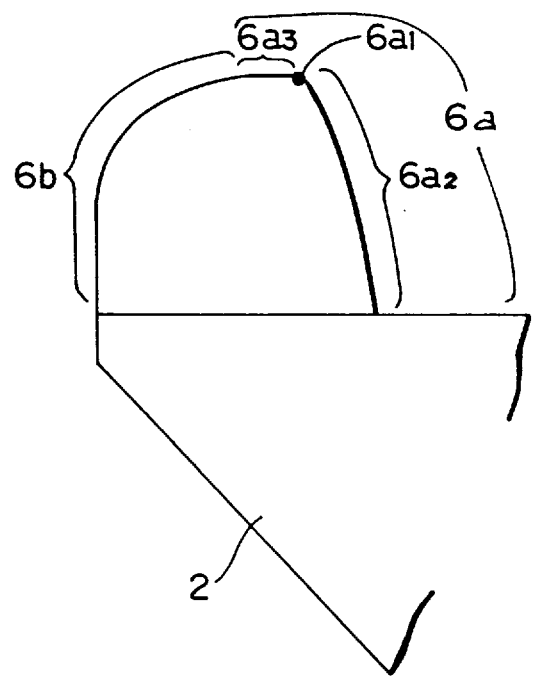
FIG. 3B is a side elevational view illustrating a state in which a fixed-side crushing blade is mounted on a fixed jaw body.

The fixed-side crushing blade 6, when seen in a side view, is formed to be smaller than the movable-side crushing blade 5 (see FIGS. 1 and 3B). Alternatively, there is an example in which the fixed-side crushing blade 6, when seen in a side view, is formed to be the same size as the fixed-side crushing blade 6, as necessary (see FIG. 7B). Still alternatively, although not particularly illustrated, the fixed-side crushing blade 6, when seen in a side view, may be formed to be larger than the movable-side crushing blade 5.

In terms of the arrangement of the movable-side crushing blade 5 and the fixed-side crushing blade 6, there is an example in which the movable-side crushing blade 5 and the fixed-side crushing blade 6 are disposed in such a manner that their positions are offset appropriately in the longitudinal direction. Namely, the movable-side crushing blade 5 and the fixed-side crushing blade 6 are disposed with their positions offset in the longitudinal direction in a state in which the movable jaw body 3 is closed on the fixed jaw body 2. The positional offset is to such an extent that the movable-side crushing blade 5 and the fixed-side crushing blade 6 do not contact each other in the state in which the fixed jaw body 2 and the movable jaw body 3 are fully closed (see portions of the movable jaw body indicated by the two-dotted dash lines in FIG. 2). Either of the fixed-side crushing blade 6 and the movable-side crushing blade 5 may be located on the outer side, but in the embodiment shown in FIGS. 1 and 2 the fixed-side crushing blade 6 is located longitudinally outwardly of the movable-side crushing blade 5.

Figure 6A:
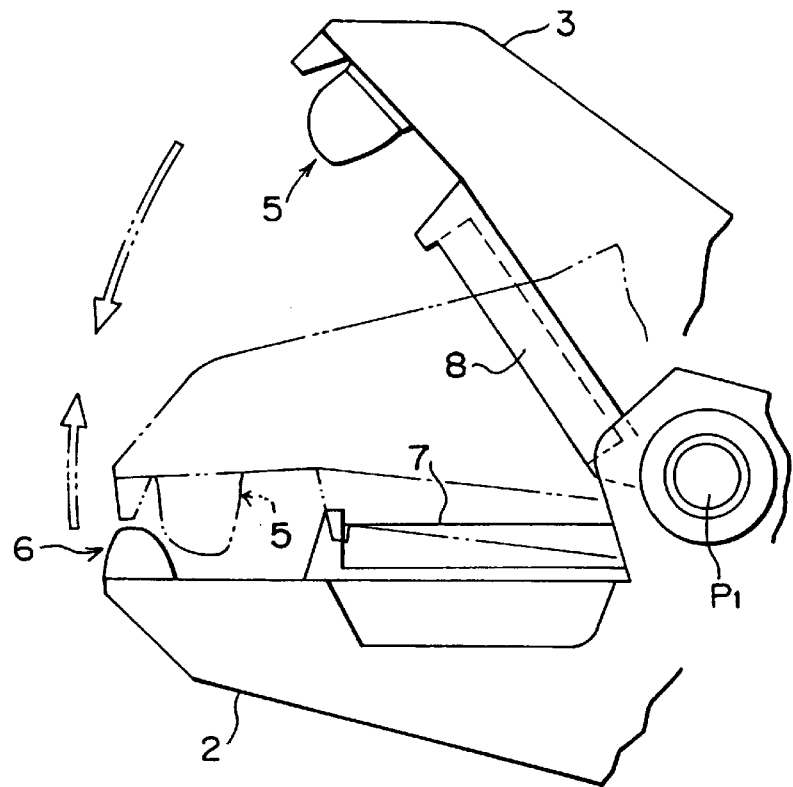
FIG. 6A is a side elevational view illustrating an example in which a right-angled portion of the fixed-side crushing blade is set on a longitudinally outer side.
Figure 6B:
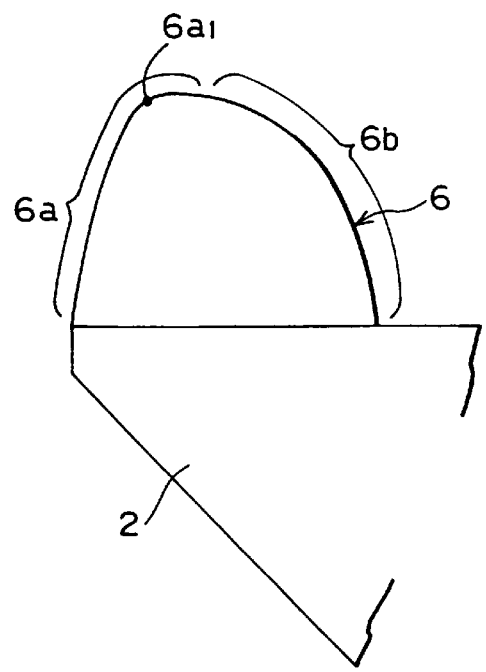
FIG. 6B is a side elevational view of an essential portion in the state in which the right-angled portion of the fixed-side crushing blade is set on the longitudinally outer side.

Further, FIGS. 6A and 6B show an embodiment in which the movable-side crushing blade 5 is disposed on the movable jaw body 3 such that its rear-side edge 5a faces the movable-jaw pivotally supporting portion $P_1$, whereas the movable-side crushing blade 6 is disposed such that its edge 6a faces the longitudinally outer side of the fixed jaw body 2.

A description will now be given of the state of a force which is exerted by the movable-side crushing blade 5 upon an object S to be crushed such as a concrete structural member when the object S to be crushed such as the concrete structural member is crushed in accordance with the present invention. FIGS. 8A, 8B, 9A and 9B show the crushing action of the movable-side crushing blade 5 and the fixed-side crushing blade 6 in accordance with the present invention. In contrast, FIG. 17 shows the action of the conventional-type crushing blade formed substantially in the shape of a half-split bead of a soroban.

First, the object S to be crushed, which is produced as a result of demolishing a structure, is clamped by the fixed jaw body 2 and the movable jaw body 3. At this time, as for the movable-side crushing blade 5, its small arcuate edge portion $5a_1$ or its vicinity is first brought into contact with the surface of the object S to be crushed. The point where the small arcuate edge portion $5a_1$ of the movable-side crushing blade 5 is first brought into contact with the surface of the object S to be crushed will be referred to as a contact portion $Q_5$ (see FIG. 8A). The state of contact of the contact portion $Q_5$ of the movable-side crushing blade 5 with respect to the surface of the object S to be crushed is substantially a state of point contact (including a state of virtual point contact) (see FIG. 8A).

Accordingly, in an initial stage of the operation of crushing by the movable-side crushing blade 5 with respect to the object S to be crushed, a crushing load F is a concentrated load at the contact portion $Q_5$ of the small arcuate edge portion $5a_1$. Namely, since the crushing load F is concentrated substantially at a single location at the contact portion $Q_5$ of the small arcuate edge portion $5a_1$ without becoming dispersed, the movable-side crushing blade 5 is able to bite into even an object S to be crushed having a hard surface by using the contact portion $Q_5$ as a center of penetration (see FIG. 9A).

Figure 17:
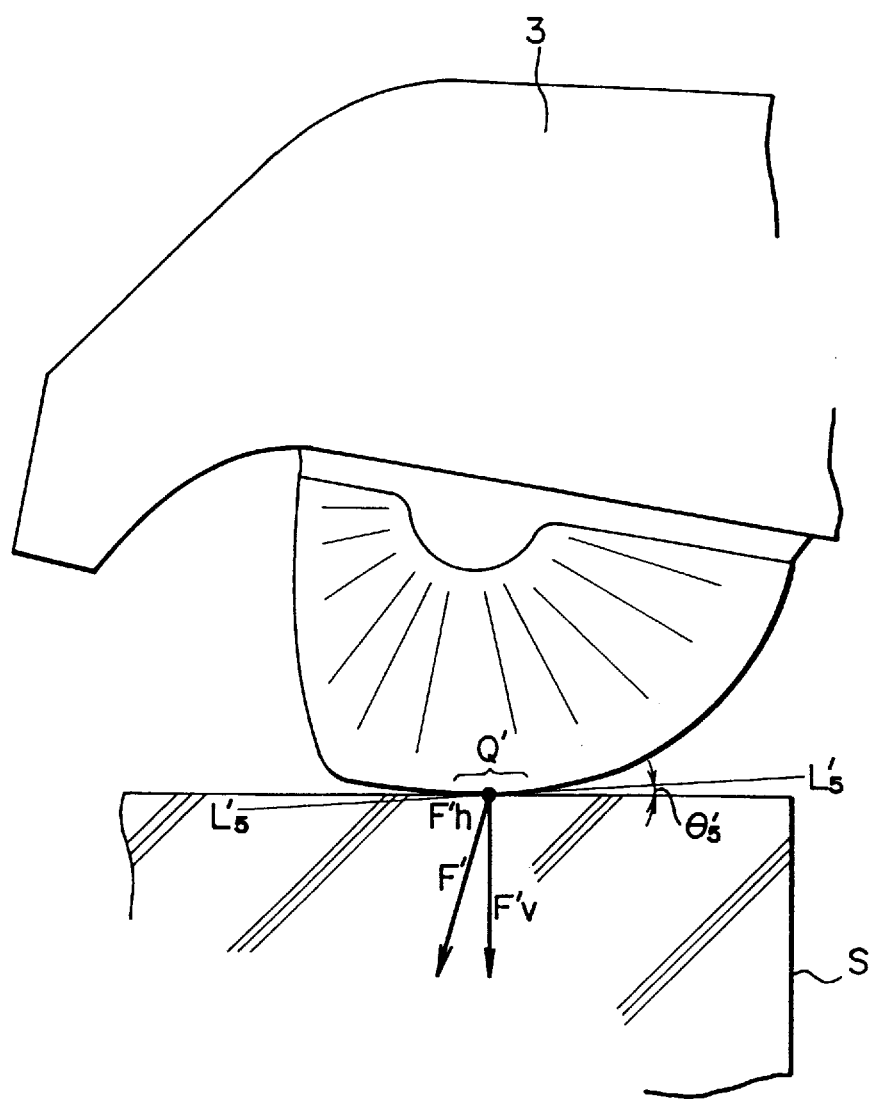
FIG. 17 is a diagram illustrating the operation using a movable-side crushing blade of a conventional type.

In contrast, in the case of the crushing machine equipped with the conventional-type crushing blade formed substantially in the shape of a half-split bead of a soroban, as shown in FIG. 17, since the rear edge side of the crushing blade is a large arcuate blade portion, clearly it cannot be said that a contact portion $Q_5'$ with respect to the object S to be crushed is in the state of point contact. This portion is in a state of line contact over a relatively large range. Accordingly, a crushing load F' is in a state of distributed load in the range of line contact at the contact portion $Q_5'$, with the result that the crushing load F' is dispersed, and constitutes quite a disadvantageous condition in crushing the object S to be crushed having a particularly hard surface.

In addition, the fixed-side crushing blade 6 also operates in a manner similar to the movable-side crushing blade 5. Namely, the small arcuate edge portion $6a_1$ or its vicinity of the fixed-side crushing blade 6 is first brought into contact with the surface of the object S to be crushed, and the point of that contact will be referred to as a contact portion $Q_6$ (see FIG. 8B). In an initial stage of the crushing operation, the crushing load F is a concentrated load at the contact portion $Q_6$ of the small arcuate edge portion $6a_1$ with respect to the surface of the object S to be crushed. Accordingly, without the dispersion of the crushing load F, the small arcuate edge portion $6a_1$ is able to bite into and crush the object S to be crushed by using the contact portion $Q_6$ as a center of penetration (see FIG. 9B).

Next, an explanation will be given to illustrate the ease with which the movable-side crushing blade 5 and the fixed-side crushing blade 6 are able to bite into the object S to be crushed. Namely, an imaginary tangential line $L_5$—$L_5$ is assumed at the rear-side edge 5a on the rear edge side (on the rear-end edge portion $5a_2$ side) of the contact portion $Q_5$ of the small arcuate edge portion $5a_1$ (see FIG. 8A). The ease of biting is illustrated by an angle $\theta_5$ which is formed by the aforementioned imaginary tangential line $L_5$—$L_5$ at the rear-side edge 5a and the surface of the object S to be crushed when the small arcuate edge portion $5a_1$ of the movable-side crushing blade 5 bites into the surface of the object S to be crushed. Namely, in FIG. 8A, the angle $\theta_5$ which is formed by the aforementioned imaginary tangential line $L_5$—$L_5$ and the surface of the object S to be crushed is large. This means that the angle at which the rear-side edge 5a of the movable-side crushing blade 5 bites into the object S to be crushed is large. Consequently, the rear-side edge 5a is capable of biting into the object S to be crushed at an acute angle and more sharply. In addition, since the resistance acting on the overall movable-side crushing blade 5 in the direction of biting into the object S to be crushed can be made small, thereby making it possible to improve the efficiency in the crushing operation.

Figure 9A:
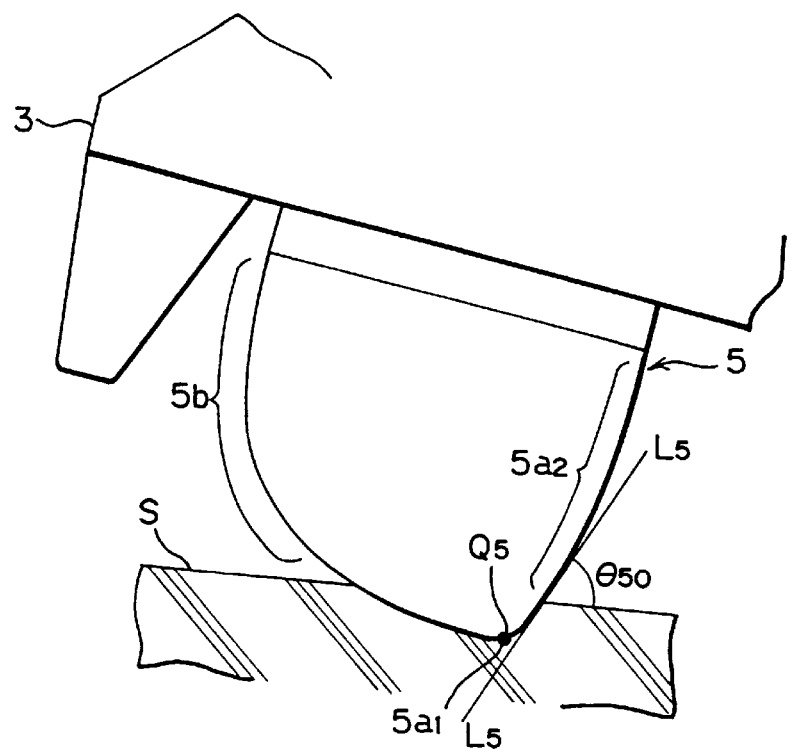
FIG. 9A is a side elevational view of the essential portion illustrating a state in which the movable-side crushing blade has slightly bitten into the object to the crushed.
Figure 9B:
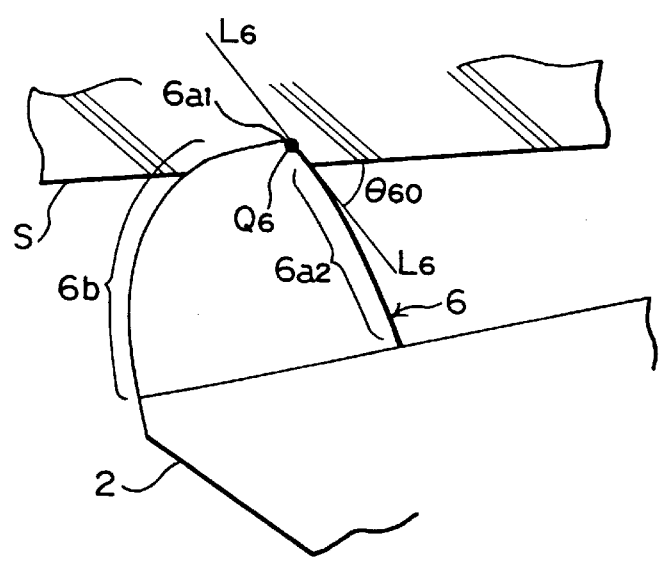
FIG. 9B is a side elevational view of the essential portion illustrating a state in which the fixed-side crushing blade has slightly bitten into the object to the crushed.

Further, the more the biting of the movable-side crushing blade 5 into the object S to be crushed proceeds, the larger becomes the angle $\theta_5$ formed by the imaginary tangential line $L_5$—$L_5$ and the surface of the object S to be crushed at the exposed portion of the rear-side edge 5a with respect to the surface of the object S to be crushed (see FIG. 9A). Then, the resistance which is exerted from the object S to be crushed in the planar direction of the object S to be crushed upon that portion of the movable-side crushing blade 5 which has bitten into the object S to be crushed becomes large. Hence, it is possible to eliminate the factor hampering the crushing operation due to the slippage of the movable-side crushing blade 5 in the planar direction of the crushing surface of the object S to be crushed, and it is possible to effect crushing with a concentrated load.

FIG. 9A shows a state in which the movable-side crushing blade 5 has bitten into the object S to be crushed from its surface to a certain depth, and an angle $\theta_{50}$ which is formed by the surface of the object S to be crushed and the imaginary tangential line $L_5$—$L_5$ at a portion of intersection of the rear-side edge 5a of the movable-side crushing blade 5 with the surface of the object S to be crushed becomes closer to a right angle, so that $\theta_{50} > \theta_5$. This indicates that the more the movable-side crushing blade 5 bites into the object S to be crushed, the larger the angle formed by the imaginary tangential line $L_5$—$L_5$ and the surface of the object S to be crushed becomes, i.e., the larger the angle of biting of the rear-side edge 5a into the object S to be crushed becomes.

In contrast, in the case of the crushing machine equipped with the conventional-type crushing blade formed substantially in the shape of a half-split bead of a soroban, as shown in FIG. 17, an angle $\theta_{5'}$ which is formed by the imaginary tangential line $L_{5'}$—$L_{5'}$ at the contact portion $Q_{5'}$ on the rear edge side of the crushing blade and the surface of the object S to be crushed becomes relatively small at several degrees. That is, the angle at which the object S to be crushed is bitten into becomes small, and the crushing blade is liable to slip forward by that margin when the object S to be crushed is crushed. In addition, the load at the cross-sectional area of crushing by the movable-side crushing blade 5 is a distributed load, so that a large force is required. For this reason, the crushing machine of this type is disadvantageous in crushing the object S to be crushed having a particularly hard surface.

Thus, in the present invention, since the contact portion $Q_5$ of the movable-side crushing blade 5 is in point contact, the crushing machine does not effect crushing over a large range instantaneously. However, particularly in crushing a hard object S to be crushed, the crushing load F is concentrated at the contact portion $Q_5$ in the initial stage of crushing since the contact portion $Q_5$ is in point contact, thereby allowing the crushing of the hard object S to be crushed to be effected.

This explanation using the imaginary tangential line also applies to the fixed-side crushing blade 6. Namely, an imaginary tangential line $L_6$—$L_6$ is assumed at the rear-side edge 6a on the rear edge side (on the rear-end edge portion $6a_2$ side) of the contact portion $Q_6$ of the small arcuate edge portion $6a_1$ (see FIG. 8B). Also, an angle $\theta_6$ which is formed by the imaginary tangential line $L_6$—$L_6$ and the surface of the object S to be crushed is large, so that the angle at which the rear-side edge 6a bites into the object S to be crushed becomes large. Consequently, the resistance acting on the fixed-side crushing blade 6 in the direction of biting into the object S to be crushed can be made smaller, thereby making it possible to improve the efficiency in the crushing operation in the same way as the movable-side crushing blade 5 (see FIG. 9B).

Further, in the same way as the case of the movable-side crushing blade 5, the resistance which is exerted from the object S to be crushed in the planar direction of the object S to be crushed upon that portion of the fixed-side crushing blade 6 which has bitten into the object S to be crushed becomes also large. Hence, it becomes difficult for the fixed-side crushing blade 6 to slip in the planar direction of the crushing surface of the object S to be crushed, and it is possible to effect crushing with a concentrated load. Even when the fixed-side crushing blade 6 has bitten into the object S to be crushed from its surface to a certain depth, an angle $\theta_{60}$ which is formed at the imaginary tangential line $L_6$—$L_6$ at a portion of intersection of the rear-side edge 6a with the surface of the object S to be crushed also becomes closer to a right angle in the same way as the case of the movable-side crushing blade 5, so that $\theta_{60} > \theta_6$. Further, the resistance which the fixed-side crushing blade 6 receives from the bitten portion of the object S to be crushed becomes large. Hence, the fixed-side crushing blade 6 is difficult to slip, and the crushing operation can be effected with a concentrated load, thereby facilitating the crushing operation.

Figure 10A:
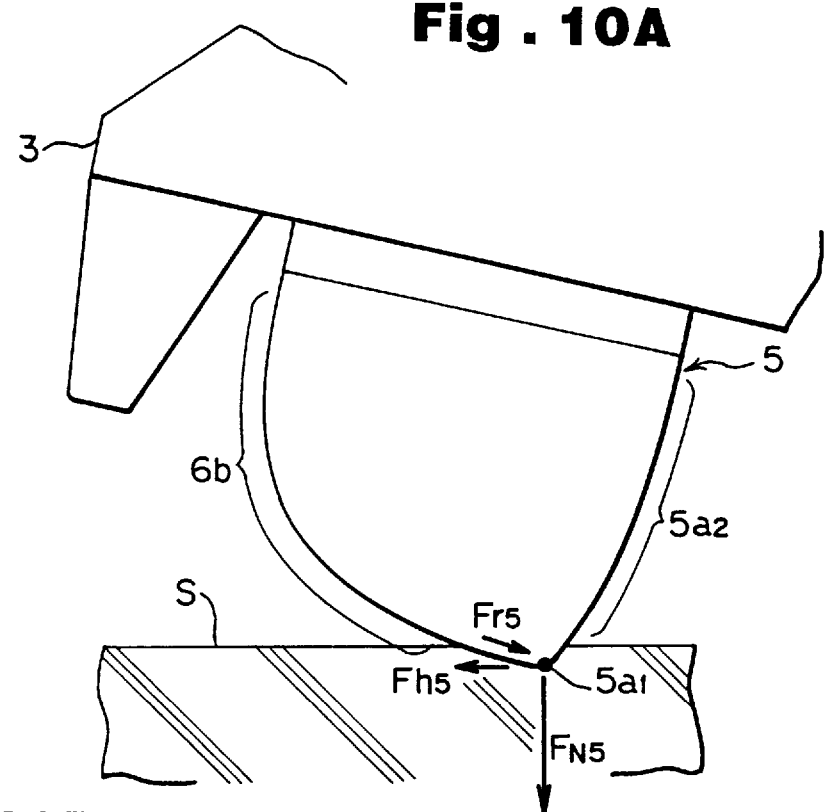
FIG. 10A is a side elevational view illustrating the fact that the movable-side crushing blade is difficult to slip on the object to be crushed when the object to be crushed is crushed by the movable-side crushing blade.

A more detailed description will be given of the theory of crushing due to slippage from another perspective. When the object S to be crushed is crushed by the conventional crushing machine, a horizontal component of the crushing force causes slippage between the movable jaw and the object S to be crushed, with the result that the crushing efficiency is possibly lowered. In contrast, when the object S to be crushed is crushed by the movable-side crushing blade 5 in the present invention, the crushing load F produces a horizontal component $Fh_5$ and a vertical component $Fv_5$ with respect to the surface of the object S to be crushed, and the vertical component $Fv_5$ serves as a crushing force, but the horizontal component $Fh_5$ serves as a force for allowing the object S to be crushed to escape in the horizontal direction (see FIG. 10A).

Figure 10B:
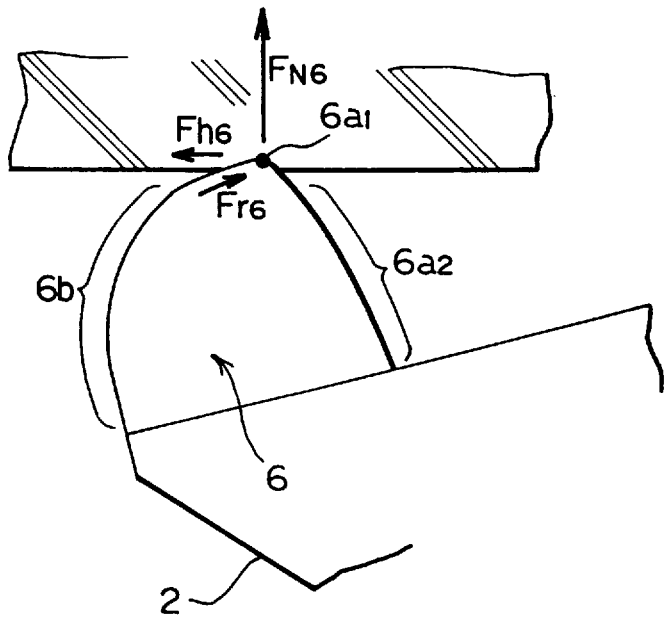
FIG. 10B is a side elevational view illustrating the fact that the fixed-side crushing blade is difficult to slip on the object to be crushed when the object to be crushed is crushed by the fixed-side crushing blade.
Figure 10C:
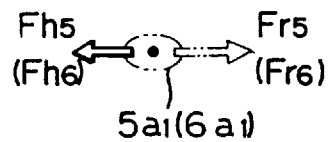
FIG. 10C is an operational diagram illustrating the fact that the crushing blade is difficult to slip on the object to be crushed when the object to be crushed is crushed by the crushing blade.

However, substantially at the same time as the horizontal component $Fh_5$ acts, the concentrated vertical component $Fv_5$ acts at the contact portion $Q_5$ of the small arcuate edge portion $5a_1$ of the movable-side crushing blade 5, and the small arcuate edge portion $5a_1$ slightly bites into the surface of the object S to be crushed. Therefore, a resistance force $Fr_5$ which opposes the horizontal component $Fh_5$ acts at the small arcuate edge portion $5a_1$ at the bitten portion. Hence, it is possible to prevent the escape of the object S to be crushed when the object S to be crushed is crushed (see FIG. 10C).

The fixed-side crushing blade 6 also acts in the same manner as the movable-side crushing blade 5. Namely, when the object S to be is crushed by the fixed-side crushing blade 6, the crushing load F produces a horizontal component $Fh_6$ and a vertical component $Fv_6$ with respect to the surface of the object S to be crushed, and the vertical component $Fv_6$ serves as a crushing force, but the horizontal component $Fh_5$ serves as a force for allowing the object S to be crushed to escape in the horizontal direction, in the same way as the action of the horizontal component $Fh_5$ and the vertical component $Fv_5$ in the case of the movable-side crushing blade 5. A resistance force $Fr_6$ which opposes that horizontal component $Fh_6$ acts, so that it is possible to prevent the escape of the object S to be crushed when the object S to be crushed is crushed (see FIG. 10B).

Figure 5:
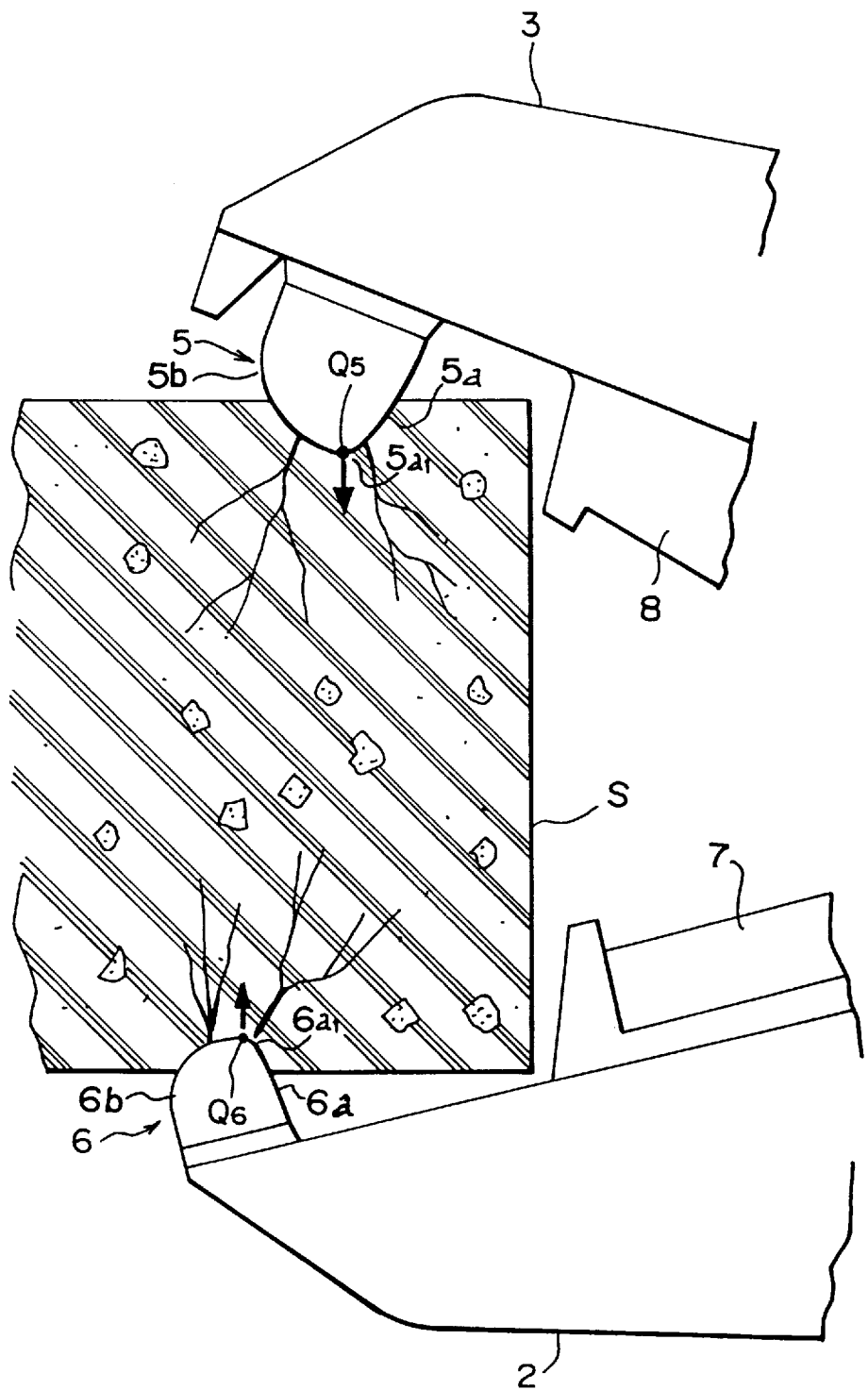
FIG. 5 is an enlarged side elevational view illustrating a state in which a crushing operation is being carried out by clamping the object to be crushed by the fixed jaw body and the movable jaw body.

FIGS. 4 and 5 show a state in which the movable-side crushing blade 5 and the fixed-side crushing blade 6 crush the object S to be crushed. First, as the object S to be crushed such as a concrete structural member, which is produced as a result of demolishing a structure, is clamped by the fixed jaw body 2 and the movable jaw body 3, the movable-side crushing blade 5 and the fixed-side crushing blade 6 come into contact with the surfaces of the object S to be crushed. At this time, as shown in FIG. 4, the ranges of the small arcuate edge portions $5a_1$ and $6a_1$ initially come into contact with the surfaces of the object S to be crushed.

Then, the state of contact at the contact portions $Q_5$ and $Q_6$ of the movable-side crushing blade 5 and the fixed-side crushing blade 6 with respect to the surfaces of the object S to be crushed is substantially a state of point contact (including a state of virtual point contact). Accordingly, in the initial stage of the operation of crushing by the movable-side crushing blade 5 and the fixed-side crushing blade 6 with respect to the object S to be crushed such as a concrete structural member, the crushing loads are concentrated loads, so that the movable-side crushing blade 5 and the fixed-side crushing blade 6 are able to bite into even the object S to be crushed having a hard surface by using the contact portions $Q_5$ and $Q_6$ as the respective center of penetration (see FIG. 5). Thus, since the object S to be crushed is clamped by the fixed jaw body 2 and the movable jaw body 3, and when the movable jaw body 3 is further closed with respect to the fixed jaw body 2, the movable-side crushing blade 5 and the fixed-side crushing blade 6 bite into the object S to be crushed, with the result that it is possible to prevent the object S to be crushed from slipping off the fixed jaw body 2 and the movable jaw body 3, so as to effect the crushing operation.

Figure 11:
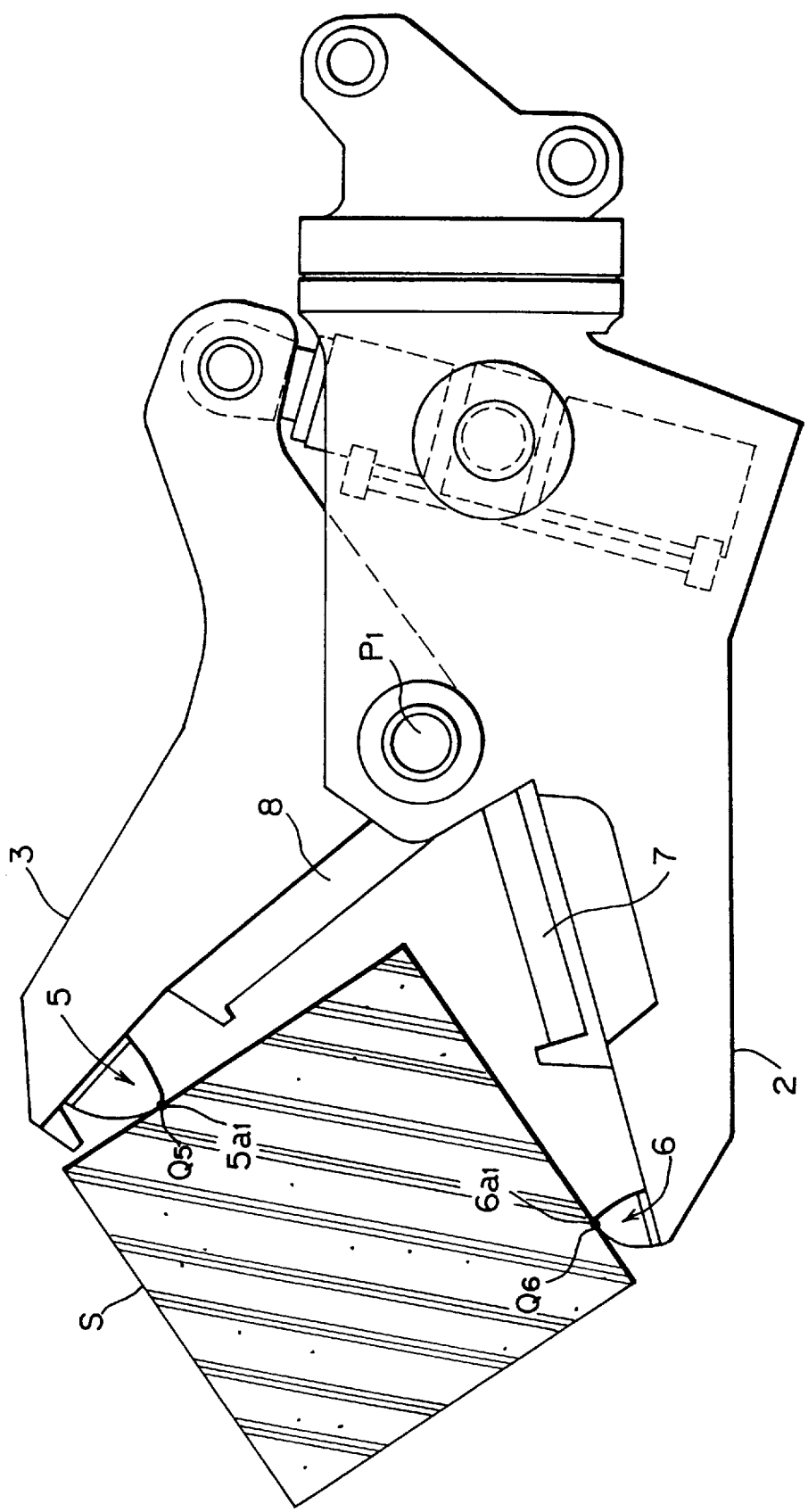
FIG. 11 is a side elevational view of the crushing machine when an attempt is made to crush an object to be crushed having a rectangular cross section from two adjacent wall surfaces of an angled portion.

In addition, FIG. 11 shows an example in which the object S to be crushed is a pillar-shaped member having a rectangular cross section, and an attempt is being made to crush the object S to be crushed at its right-angled corner portions, i.e., at its adjacent two wall surfaces, by means of the movable-side crushing blade 5 and the fixed-side crushing blade 6. In this case, the small arcuate edge portion $5a_1$ of the movable-side crushing blade 5 and the small arcuate edge portion $6ia_1$ of the fixed-side crushing blade 6 are brought into contact with the two wall surfaces, and crushing is effected at the portions of the respective contact portion $Q_5$ and contact portion $Q_6$ (see FIG. 12).

Figure 12:
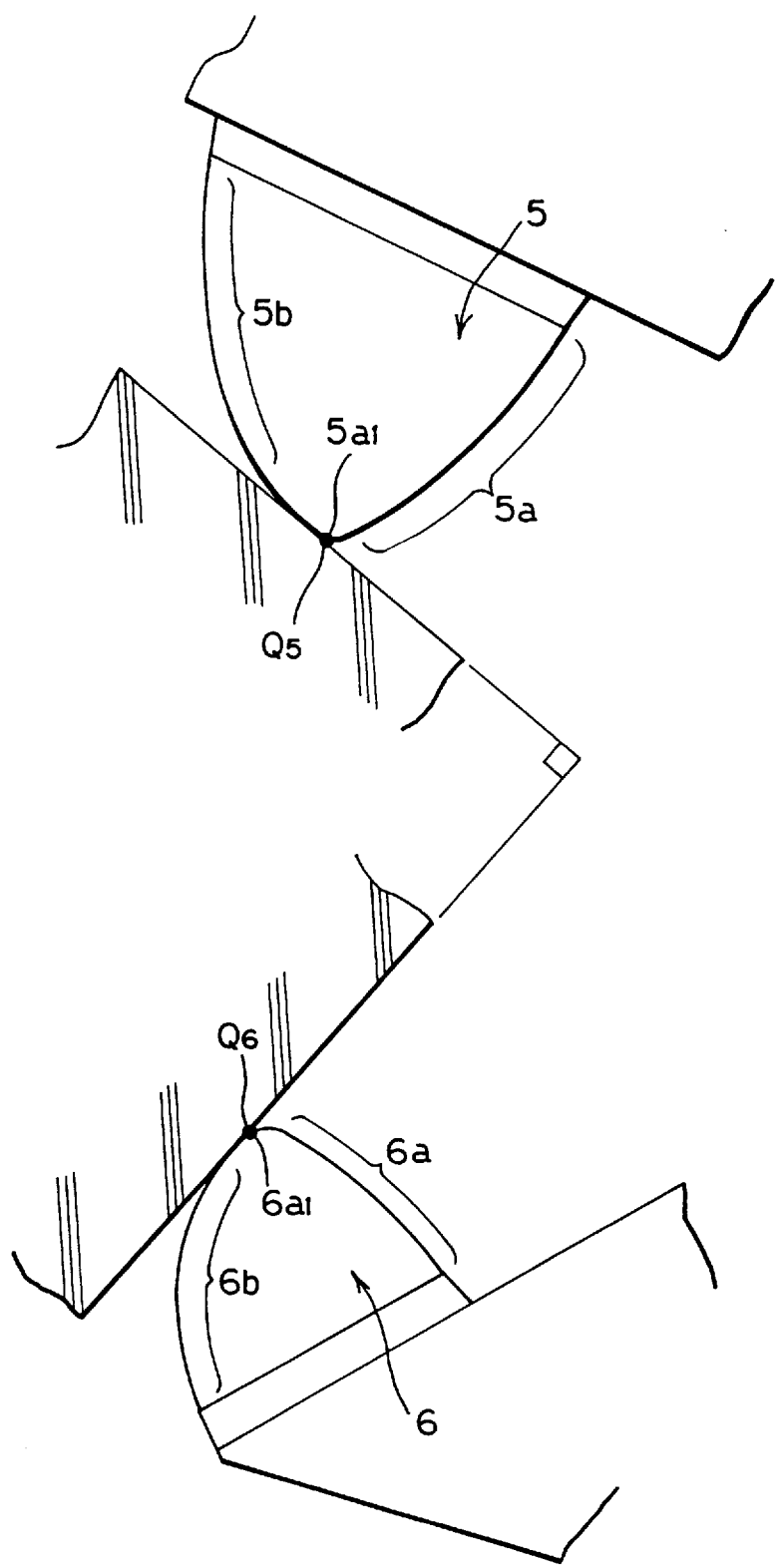
FIG. 12 is an enlarged schematic diagram illustrating an initial stage of crushing the object to be crushed having the rectangular cross section.

The small arcuate edge portions $5a_1$ and $6a_1$ and the contact portions $Q_5$ and $Q_6$ in the adjacent two wall surfaces of the object S to be crushed are present at the two wall surfaces which join at right angles. For this reason, as shown in FIGS. 11 and 12, each of the two surfaces constitutes a surface which is inclined at a sharp angle with respect to each of the contact portions $Q_5$ and $Q_6$, so that the movable-side crushing blade 5 and the fixed-side crushing blade 6 are in a state in which they are seemingly liable to slip on the two wall surfaces.

Figure 13:
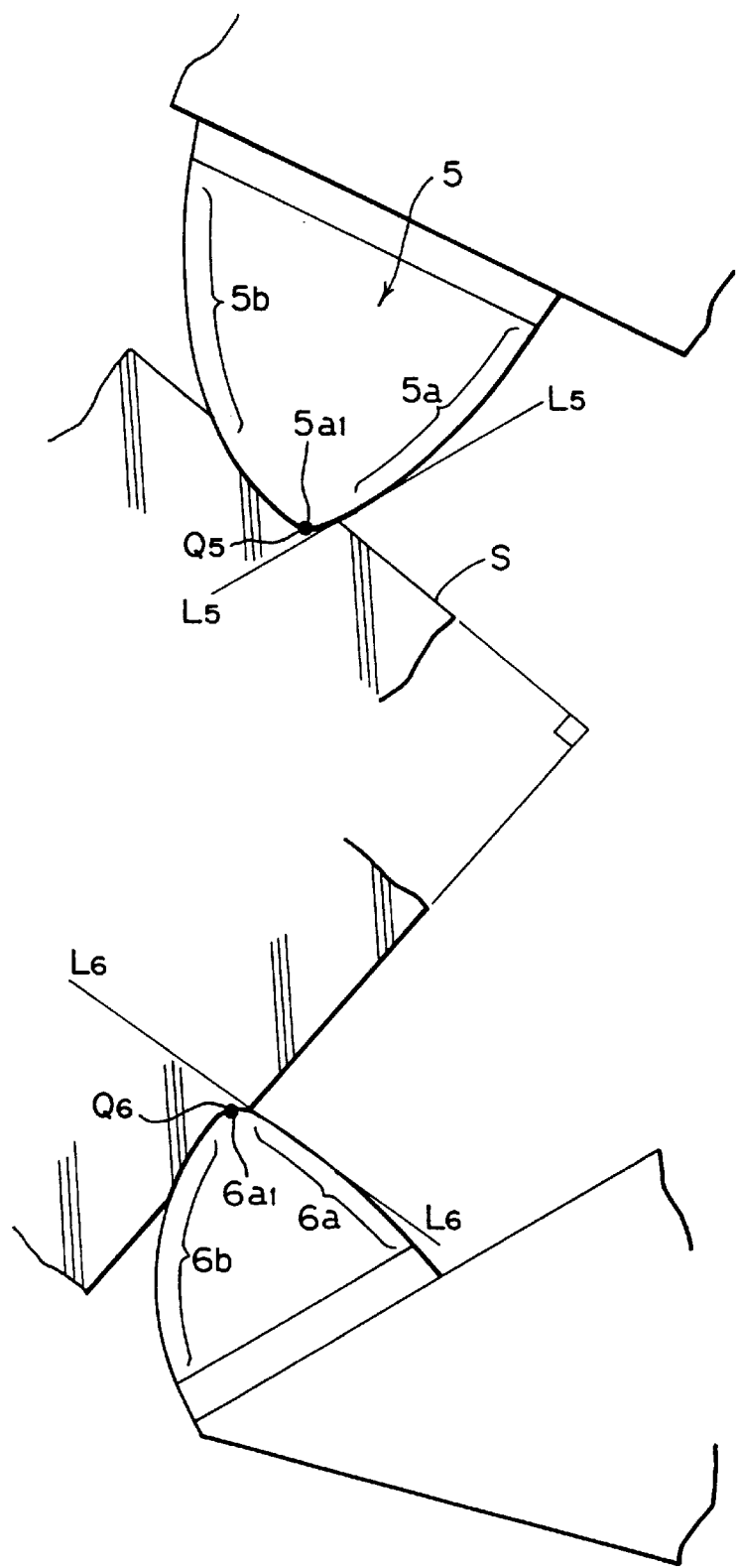
FIG. 13 is an enlarged schematic diagram illustrating a state in which the movable-side crushing blade and the fixed-side crushing blade have bitten into the object to be crushed having the rectangular cross section.

However, the angle $\theta_5$ formed by the imaginary tangential line $L_5$—$L_5$ at the movable-side crushing blade 5 and the wall surface as well as the angle $\theta_6$ formed by the imaginary tangential line $L_6$—$L_6$ at the fixed-side crushing blade 6 and the wall surface are both large, so that their biting angles are also large. Consequently, the movable-side crushing blade 5 and the fixed-side crushing blade 6 bite into the wall surfaces before beginning to slip on the inclined two wall surfaces, thereby making it possible to effect crushing (see FIG. 13).

Figure 14:
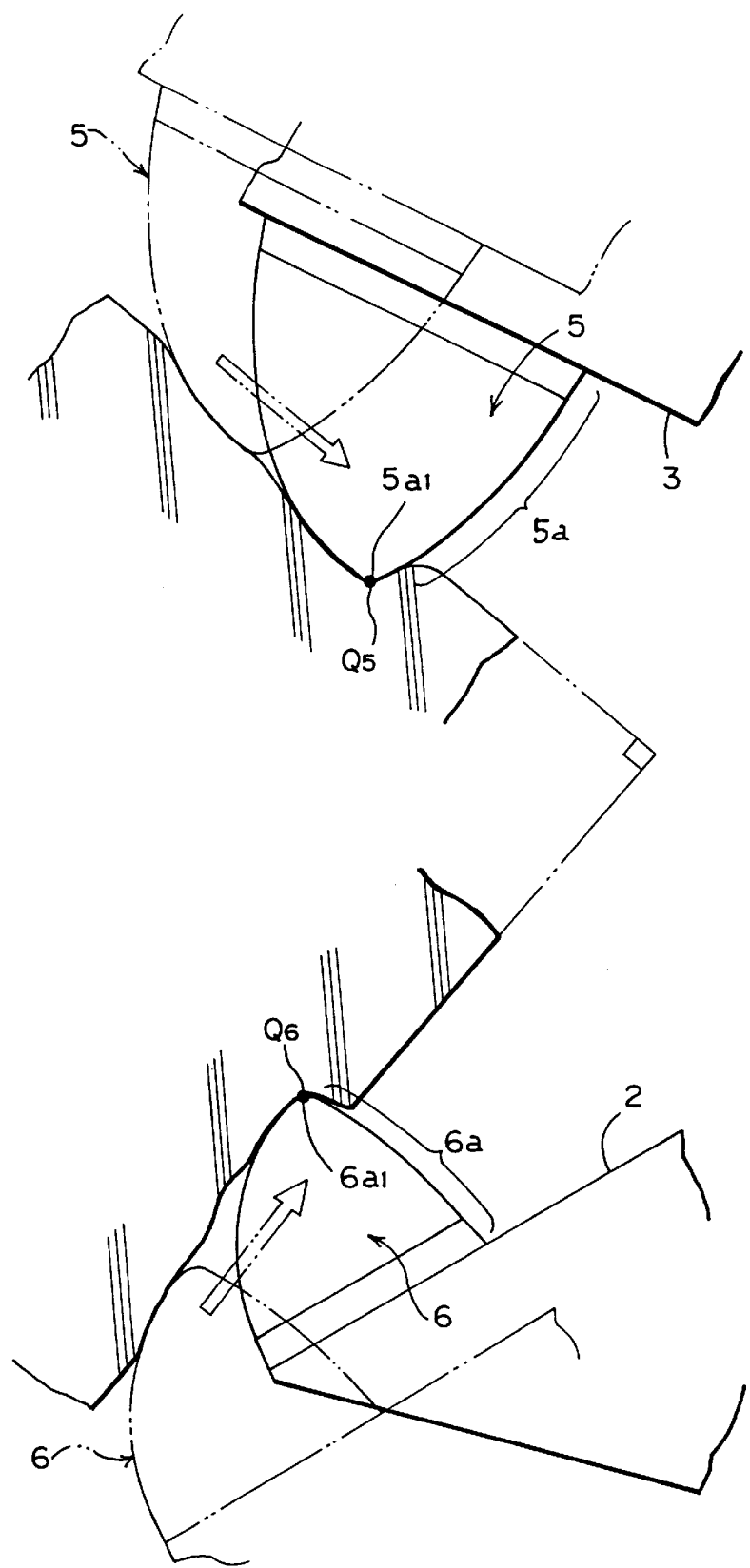
FIG. 14 is an enlarged schematic diagram illustrating a state in which the movable-side crushing blade and the fixed-side crushing blade, while slipping, bite into the object to be crushed having the rectangular cross section.

Further, even in a case where slippage has occurred at the same time as the crushing by the movable-side crushing blade 5 and the fixed-side crushing blade 6, since the small arcuate edge portions $5a_1$ and $6a_1$ are in constant contact, so that the arcuate edge portions $5a_1$ and $6a_1$ begin to bite into the two wall surfaces while slipping. Once the arcuate edge portions $5a_1$ and $6a_1$ begin to bite, the angles $\theta_5$ and $\theta_5$ formed by the aforementioned respective imaginary tangential lines $L_5$—$L_5$ and $L_6$—$L_6$ and the respective wall surfaces become gradually large. Hence, resistance forces of the object S to be crushed acting against the movable-side crushing blade 5 and the fixed-side crushing blade 6 become large, and the slippage stops due to the resistance forces, thereby making it possible to crush the object S to be crushed (see FIG. 14).

As described above, as illustrated in the embodiment shown in FIGS. 1 and 2, the crushing machine comprises: the crushing machine outer casing 1; the fixed jaw body 2 provided fixedly on the crushing machine outer casing 1; the movable jaw body 3 provided movably on the crushing machine outer casing to effect an opening and closing operation in cooperation with the fixed jaw body 3; the movable-side crushing blade 5 formed substantially in the shape of a semicircular crushing blade and including the rear-side edge 5a which is formed in a substantially right-angled shape with the small arcuate edge portion $5a_1$ located at an angled portion thereof and the front-side edge 5b which as a whole is generally formed by a large arcuate edge portion, the rear-side edge 5a being located in such a manner as to face the longitudinally inward direction side of the movable jaw body 3; and the fixed-side crushing blade 6 formed substantially in the shape of a semicircular crushing blade and provided at a distal end of the fixed jaw body 2. Accordingly, first of all, the crushing machine is suitable for crushing the object S to be crushed such as a particularly hard concrete structure member, and the object S to be crushed such as the concrete structural member, which is clamped by the fixed jaw body 2 and the movable jaw body 3 during the crushing operation, can be reliably crushed without causing slippage. Secondly, the structure is very simple. Thus, various advantages are offered in accordance with the above-described arrangement.

To give a more detailed description of these advantages, since the movable-side crushing blade 5 and the fixed-side crushing blade 6 are respectively provided on the movable jaw body 3 and the fixed jaw body 2, when the object S to be crushed such as a concrete structural member is crushed, both the movable-side crushing blade 5 and the fixed-side crushing blade 6 simultaneously bite into the object S to be crushed such as the concrete structural member, and are capable of cracking the object S to be crushed at its both surfaces, thereby making it possible to effect crushing vary speedily.

In particular, as for the movable-side crushing blade 5, since the rear-side edge 5a is made substantially right-angled via the small arcuate edge portion $5a_1$, in a state in which the rear-side edge 5a is in contact with the surface of the object S to be crushed such as a concrete structural member to effect crushing, the small arcuate edge portion $5a_1$ is mainly in contact. Since the small arcuate edge portion $5a_1$ has a very small radius of curvature, the state of its contact with the object S to be crushed such as the concrete structural member becomes a state of point contact (including a state of virtual point contact).

Accordingly, in the initial stage of crushing the object S to be crushed such as the concrete structural member by the movable-side crushing blade 5, it is possible to obtain a concentrated crushing load due to the contact portion of the small arcuate edge portion $5a_1$ with respect to the object S to be crushed such as the concrete structural member. Namely, the crushing load is concentrated substantially at one location without becoming dispersed at the contact portion of the small arcuate edge portion $5a_1$ with respect to the object S to be crushed such as the concrete structural member. Hence, it is possible for the movable-side crushing blade 5 to favorably bite into even an object S to be crushed having a hard surface such as the concrete structural member.

In addition, it is possible to enlarge the biting angle at a time when the rear-side edge 5a of the movable-side crushing blade 5 bites at the contact portion of the small arcuate edge portion $5a_1$ with respect to the object S to be crushed such as the concrete structural member. Namely, the movable-side crushing blade 5 bites into the object S to be crushed such as the concrete structural member in the form of a wedge, and is therefore made difficult to slip. For this reason, the largest advantage lies in that the operation of crushing the object S to be crushed can be effected with extremely high efficiency by virtue of the synergistic effect which is obtained from the fact that the aforementioned crushing load acts in a concentrated manner and that the crushing blade is difficult to slip at the concentrated portion, and because, on the fixed jaw body 2 side, the fixed-side crushing blade 6 bites into the object S to be crushed from the opposite side to the movable-side crushing blade 5.

Figure 7B:
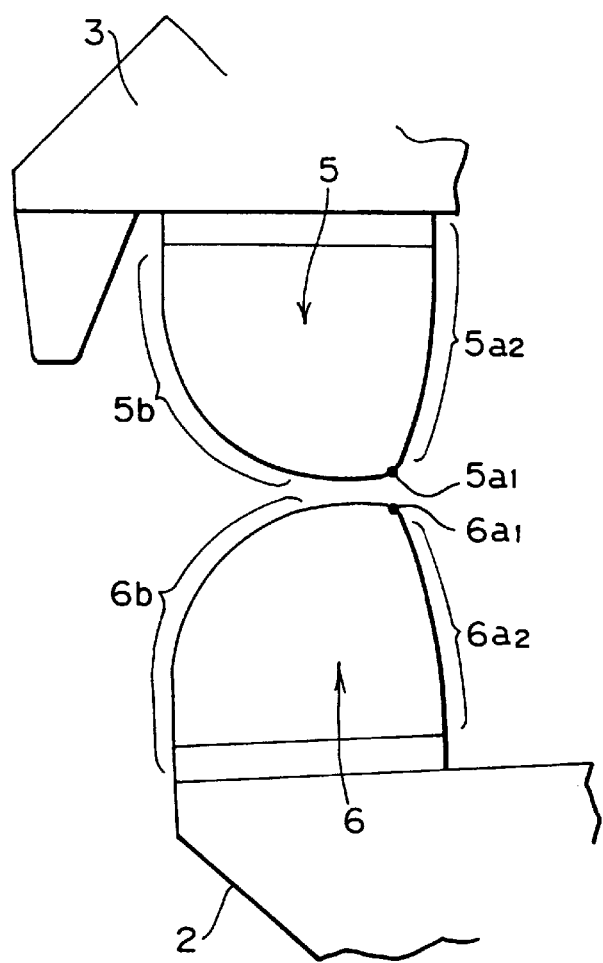
Figure 8A:
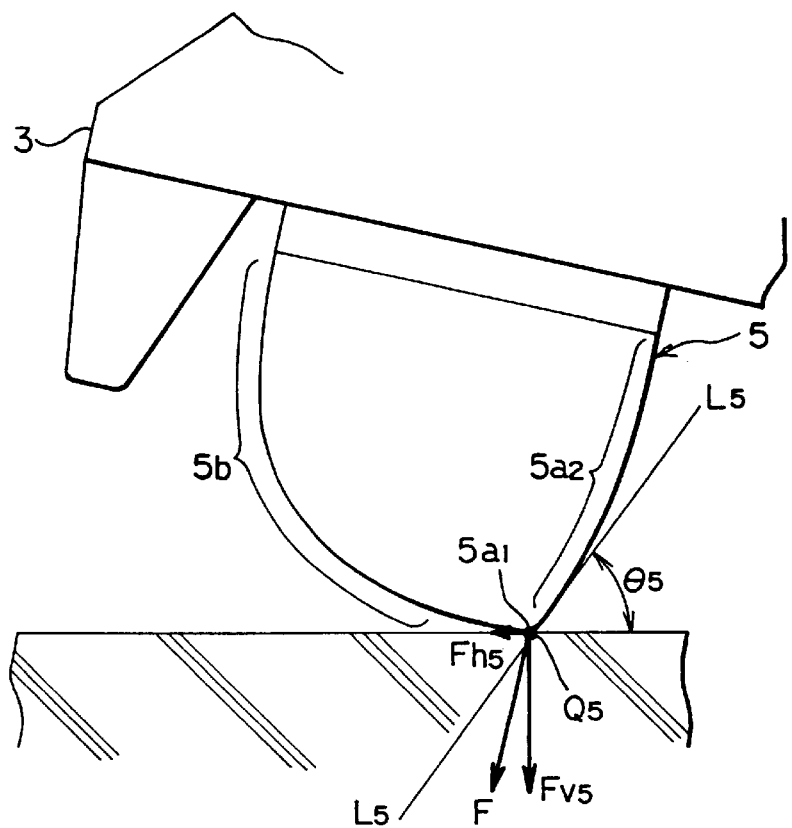
FIG. 8A is an enlarged side elevational view illustrating the crushing action of the movable-side crushing blade.
Figure 8B:
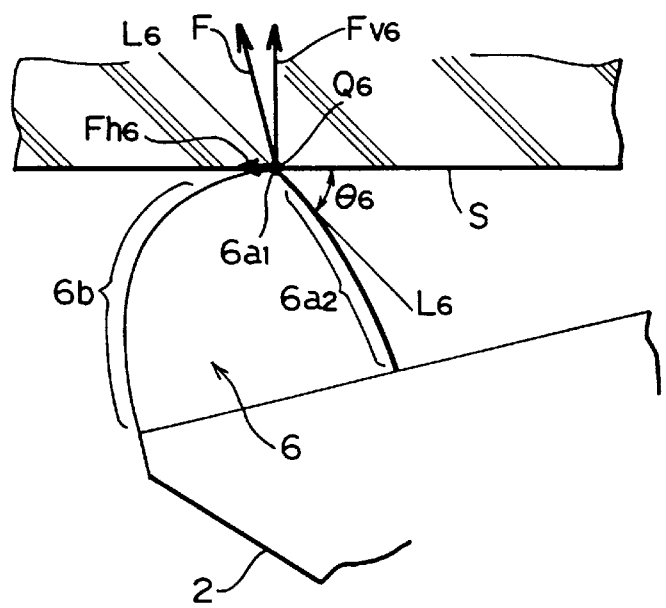
FIG. 8B is an enlarged side elevational view illustrating the crushing action of the fixed-side crushing blade.

Next, in the embodiment shown in FIG. 7B, the arrangement provided is such that the fixed-side crushing blade 6 has a shape substantially similar to that of the movable-side crushing blade 5, and has the rear-side edge 6a which is located in such a manner as to face the longitudinally inward direction side of the fixed jaw body 2. Consequently, since the rear-side edge 6a of the fixed-side crushing blade 6 faces the longitudinally inward direction side of the fixed jaw body 2, i.e., since the rear-side edge 6a of the fixed-side crushing blade 6 is mounted on the same side as that of the movable-side crushing blade 5, in a case where the object S to be crushed, which is clamped by the fixed jaw body 2 and the movable jaw body 3, is crushed, when the movable-side crushing blade 5 moves in the direction of closing with respect to the fixed-side crushing blade 6, the operation is effected in such a manner as to send the object S to be crushed in the longitudinally inward directions of the fixed jaw body 2 and the movable jaw body 3, i.e., in a direction toward the movable-jaw pivotally supporting portion $P_1$, thereby making it possible to reliably crush the object S to be crushed.

In the embodiment shown in FIGS. 3A and 3B, the arrangement provided is such that the fixed-side crushing blade 6 has a shape substantially similar to that of the movable-side crushing blade, and has the rear-side edge 6a which is located in such a manner as to face the longitudinally inward direction side of the fixed jaw body 2, the fixed-side crushing blade 6 in a side view being smaller than the movable-side crushing blade 5. Consequently, in the crushing of the object S to be crushed, the fixed-side crushing blade 6 is first capable of biting into the object S to be crushed relatively speedily so as to reliably fix the object S to be crushed on the fixed jaw body 2 side. At the same time, the large movable-side crushing blade 5 powerfully crushes the object S to be crushed, thereby making it possible to reliably effect the crushing operation without loss in operation.

Figure 16A:
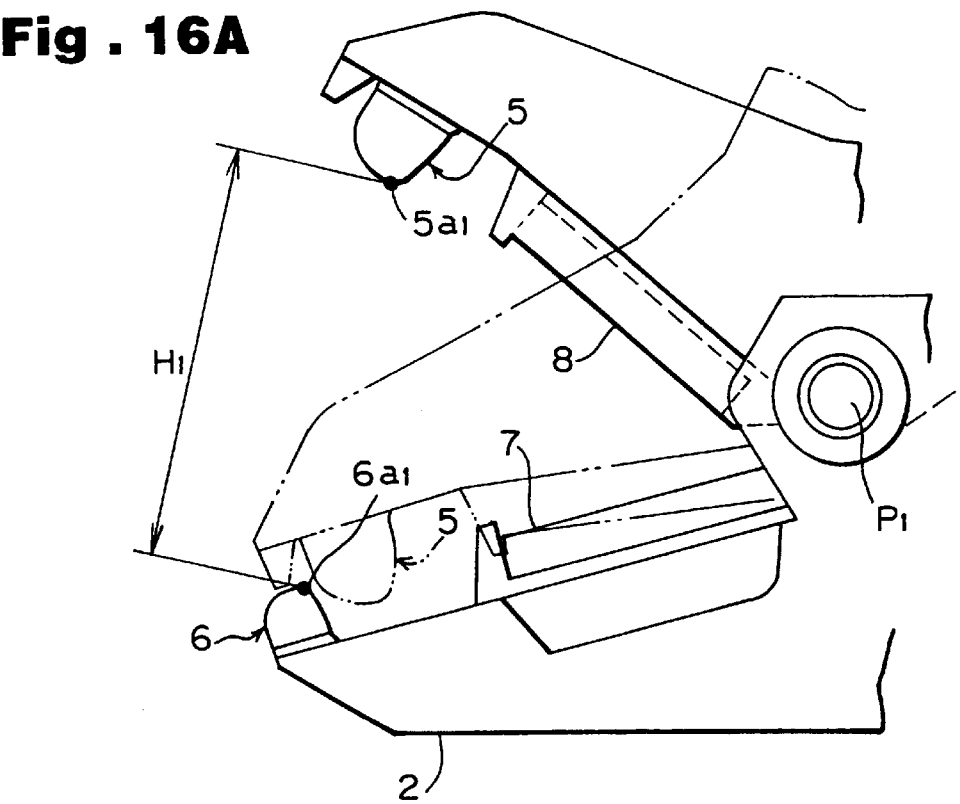
FIG. 16A is a side elevational view of the crushing machine illustrating an interval between the movable-side crushing blade and the fixed-side crushing blade in a state in which the movable-side crushing blade and the fixed-side crushing blade are positionally offset from each other.
Figure 16B:
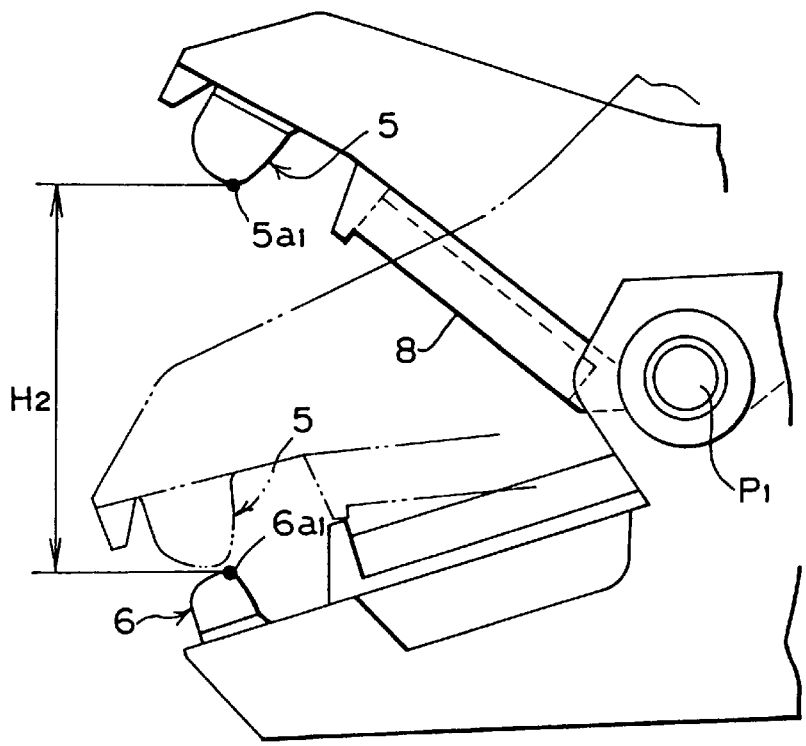
FIG. 16B is a side elevational view of the crushing machine illustrating an interval between the movable-side crushing blade and the fixed-side crushing blade in a state in which the movable-side crushing blade and the fixed-side crushing blade are not positionally offset from each other.

Next, in the above-described arrangements of the present invention, if the movable-side crushing blade 5 and the fixed-side crushing blade 6 are disposed such that positions thereof are appropriately offset from each other in the longitudinal direction, as for the movable-side crushing blade 5 and the fixed-side crushing blade 6, when the fixed jaw body 2 and the movable jaw body 3 are fully opened relative to each other, the interval $H_1$ between the movable-side crushing blade 5 and the fixed-side crushing blade 6 can be made larger than the interval $H_2$ between the movable-side crushing blade 5 and the fixed-side crushing blade 6 in a case where their positions are not offset from each other (see FIGS. 16A and 16B).

Consequently, it is possible to clamp a larger object S to be crushed and to crush the same. In addition, the positional offset of the movable-side crushing blade 5 and the fixed-side crushing blade 6 make it possible to fully close the fixed jaw body 2 and the movable jaw body 3 as compared with a case where their positions are not offset from each other. This makes it possible to effect crushing into smaller pieces.

Next, as shown in the embodiment illustrated in FIG. 2, if the fixed-side crushing blade 6 is positioned longitudinally outwardly of the movable-side crushing blade, it is possible to allow a large crushing force to be produced instantaneously by the fixed-side crushing blade 6.

Figure 15A:
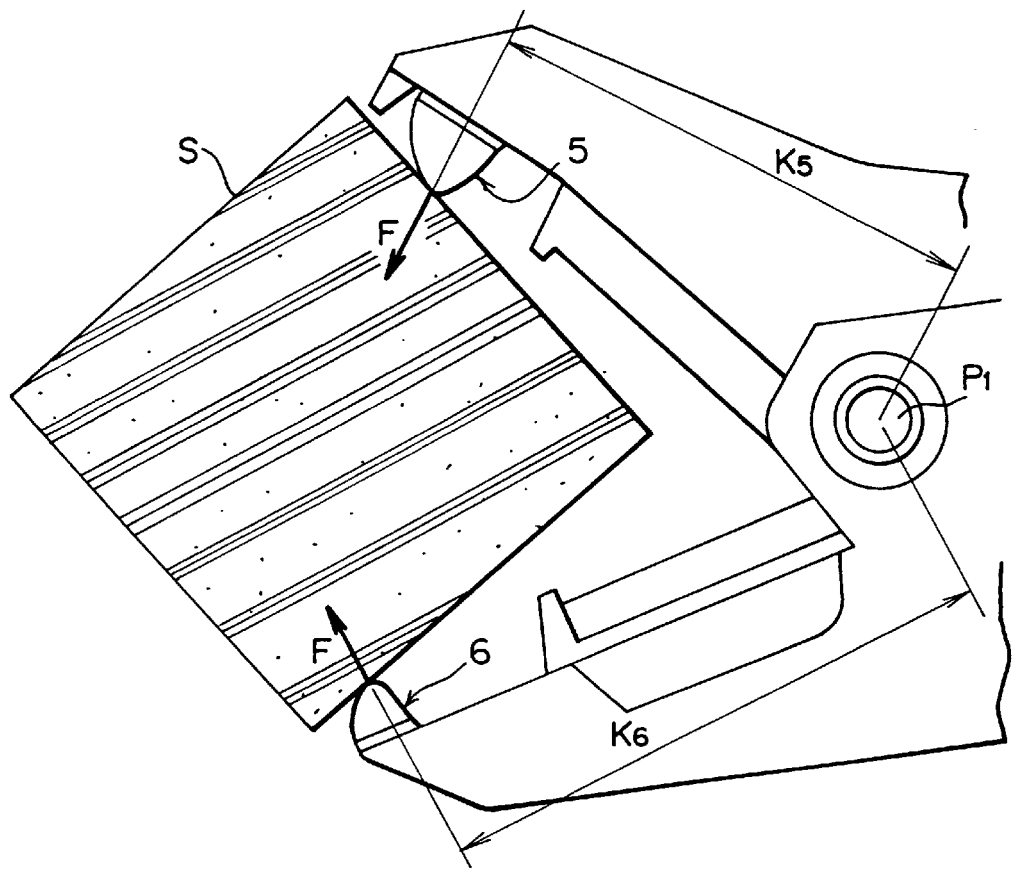
FIG. 15A is a side elevational view of essential portions of the crushing machine illustrating the working of force when the object to be crushed is crushed by the movable-side crushing blade.

Namely, the crushing forces F exerted by the movable-side crushing blade 5 and the fixed-side crushing blade 6 upon the object S to be crushed differ in the direction but their magnitudes are equal. At the same time, since the fixed-side crushing blade 6 is located longitudinally outwardly of the movable-side crushing blade 5, a distance $K_6$ from the movable-jaw pivotally supporting portion $P_1$ to the position of the fixed-side crushing blade 6 is greater than a distance $K_5$ from the movable-jaw pivotally supporting portion $P_1$ to the position of the movable-side crushing blade 5, so that $K_5 > K_6$ (see FIG. 15A).

Figure 15B:
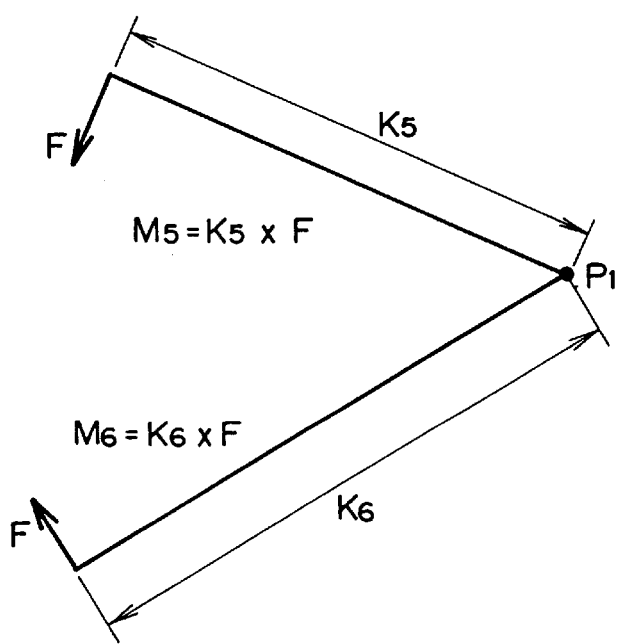
FIG. 15B is an operational diagram illustrating the working of force when the object to be crushed is crushed by the movable-side crushing blade.

Hence, the moment of force of the movable-side crushing blade 5 and the fixed-side crushing blade 6 for crushing the object S to be crushed becomes $M_5 = K_5 \times F$ and $M_6 = K_6 \times F$, respectively. Accordingly, the relationship becomes such that the moment $M_6 > M_5$ (see FIG. 15B). Accordingly, in the initial moment of crushing the object S to be crushed, it is possible to apply a large crushing force to the fixed-side crushing blade 6 side. Further, if the fixed-side crushing blade 6 is made smaller than the movable-side crushing blade 5, the biting into the object S to be crushed by the fixed-side crushing blade 6 becomes slightly speedier than the movable-side crushing blade 5, so that it is possible to effect the crushing of the object S to be crushed on a stable basis.

What is claimed is:

1. A crushing machine comprising:

an outer casing;

a fixed jaw body provided fixedly on said outer casing;

a movable jaw body provided movably on said outer casing to effect an opening and closing operation in cooperation with said fixed jaw body;

a movable-side crushing blade having a substantially semicircular shape provided at a distal end of said movable jaw body, said crushing blade including:

a rear-side edge having a rear-end edge portion, a front-end edge portion, and a small arcuate edge portion, said rear-end edge portion and said small arcuate edge portion forming a substantially right-angled shape, said small arcuate edge portion located at an apex of said right-angled shape;

a front-side edge generally formed by a large arcuate edge portion, said crushing blade being oriented such that said rear-side edge is located at a position closer to a longitudinally inward direction side of said movable jaw body relative to said front-side edge; and a fixed-side crushing blade provided at a distal end of said fixed jaw body.

2. A crushing machine according to claim 1, wherein said fixed-side crushing blade has a shape substantially similar to that of said movable-side crushing blade, and has a rear-side edge oriented to face a longitudinally inward direction away from said distal end of said fixed jaw body.

3. A crushing machine according to claim 2, wherein said fixed-side crushing blade in a side view being smaller than said movable-side crushing blade.

4. A crushing machine according to claim 1, wherein said movable-side crushing blade and said fixed-side crushing blade are disposed such that positions thereof are appropriately offset from each other in the longitudinal direction.

5. A crushing machine according to claim 4, wherein said fixed-side crushing blade is positioned longitudinally outwardly of said movable-side crushing blade.

6. A crushing machine according to claim 1, wherein said fixed-side crushing blade has a shape substantially similar to that of said movable-side crushing blade, and has a rear-side edge oriented to face a longitudinally outward direction towards said distal end of said fixed jaw body.

* * * * *